April 28, 1936. E. F. GOODYEAR ET AL 2,038,898
AIRCRAFT BRAKE
Filed May 4, 1934   3 Sheets-Sheet 2
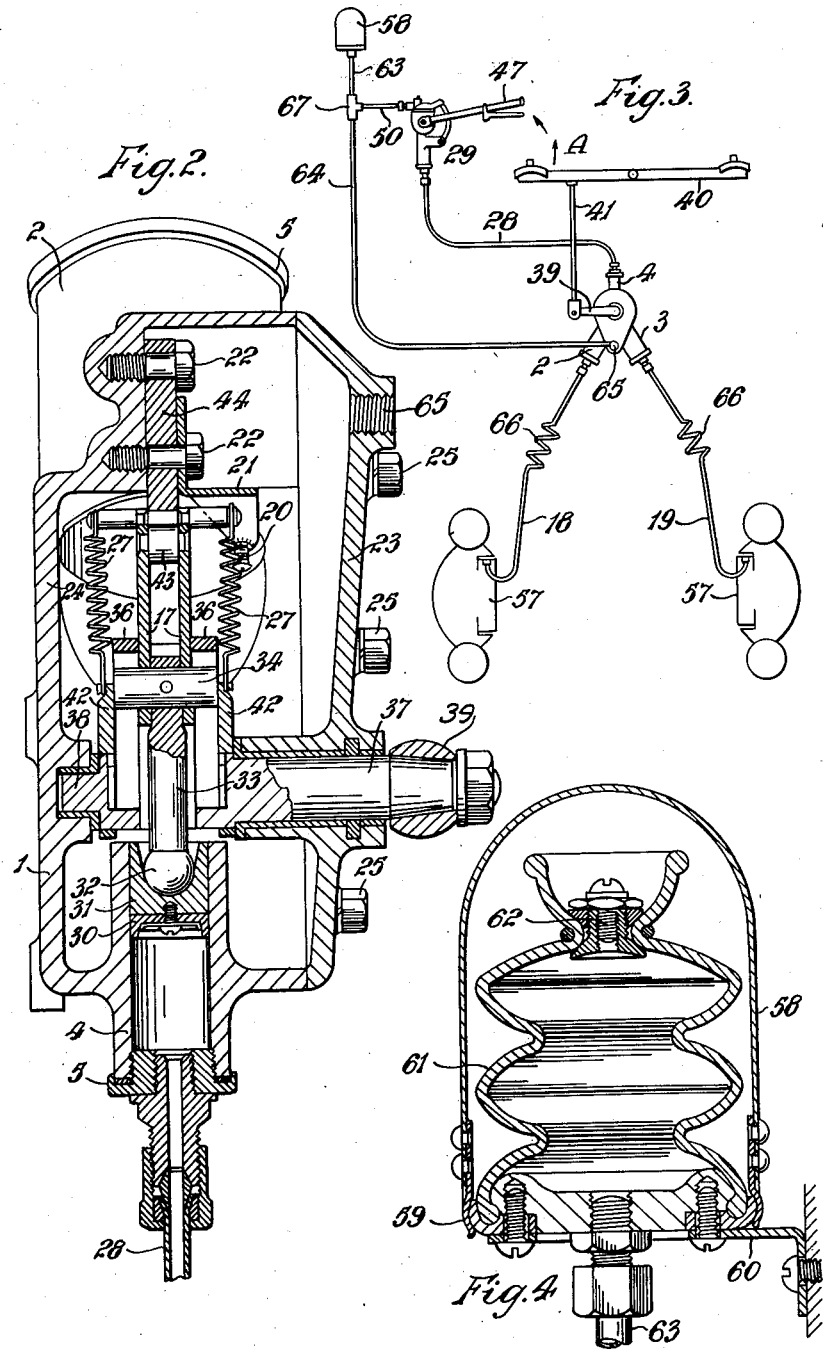

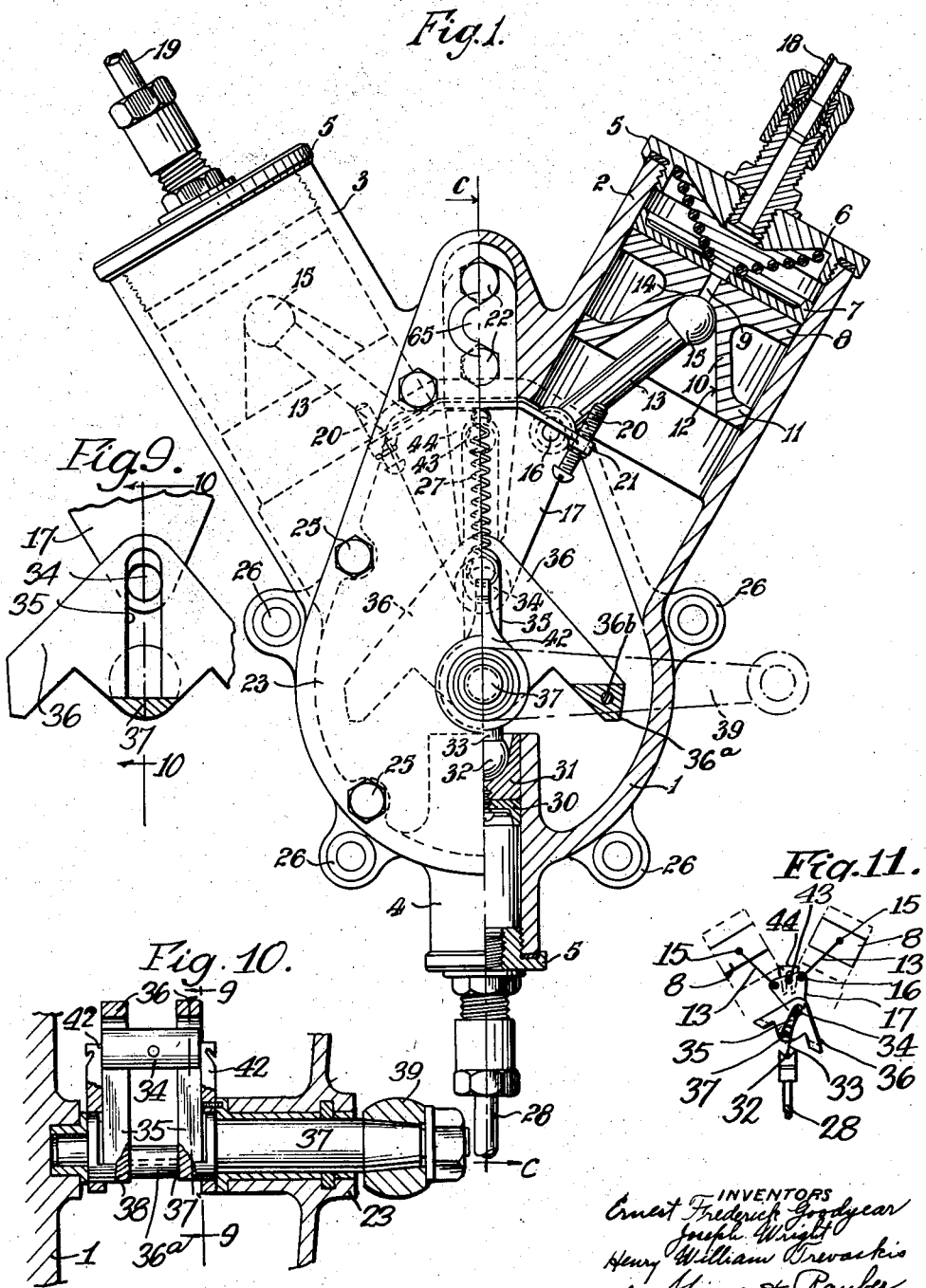

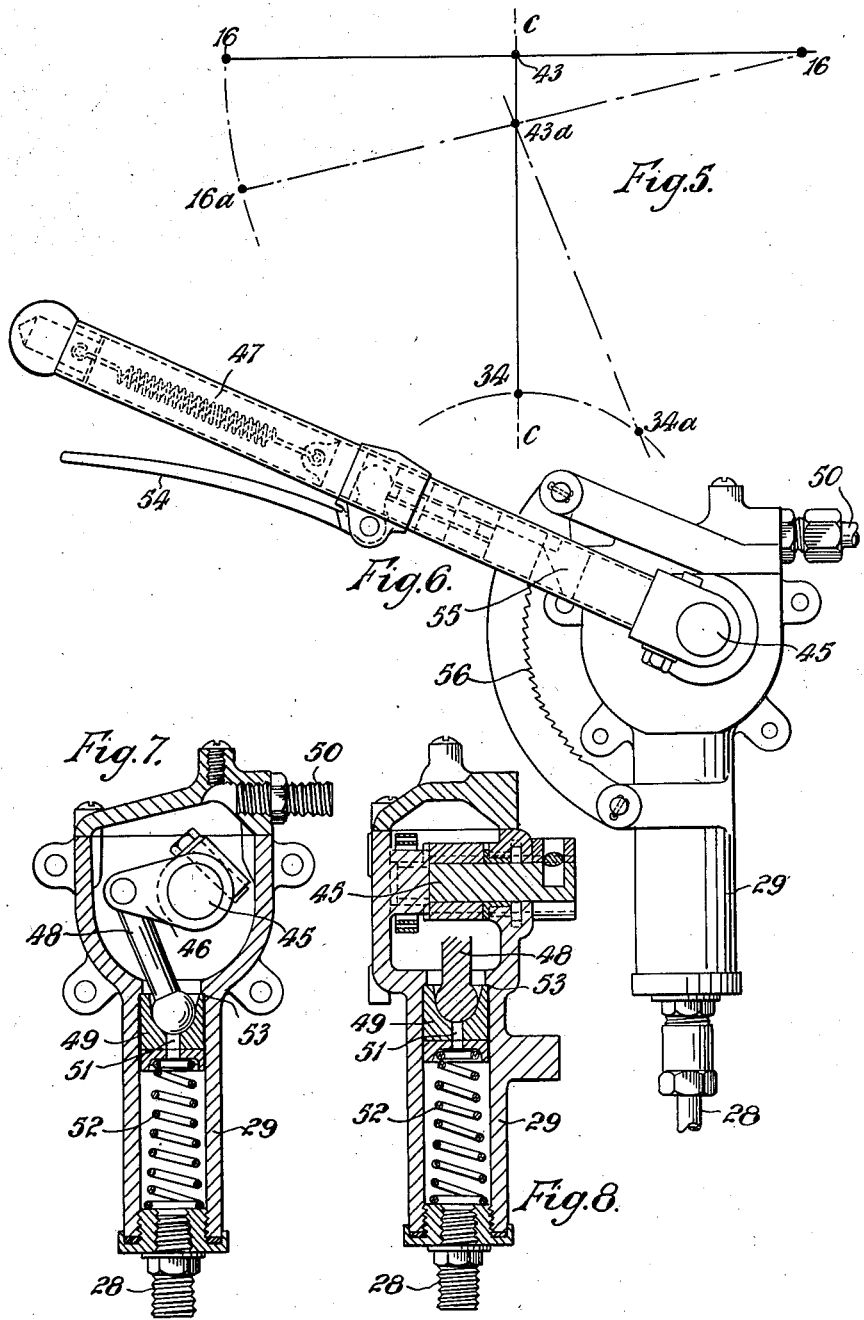

Patented Apr. 28, 1936

2,038,898

UNITED STATES PATENT OFFICE 2,038,898

AIRCRAFT BRAKE

Ernest Frederick Goodyear, Moxhall Park, Wishaw, Joseph Wright, Stoke Park, Coventry, and Henry William Trevaskis, Keresley, Coventry, England, assignors to Dunlop Rubber Company Limited, London, England, a British company Application May 4, 1934, Serial No. 723,876
In Great Britain May 10, 1933

11 Claims. (Cl. 188—152)

This invention concerns improvements in brakes for aircraft and more particularly concerns hydraulic brakes of the kind in which an equalized brake pressure is exerted when the aircraft is landing in a straight line and unequalized pressure when it is desired to cause the aircraft to turn to one side or the other.

The invention enables the pilot to apply an equalized but variable pressure to two brakes or groups of brakes on opposite sides of the fore and aft axis of the aircraft and is characterized by automatic means for rendering the brake pressures on opposite sides of the fore and aft axis unequal when the pilot deflects the rudder to steer the aircraft to right or left.

The automatic means also operates in such a manner as to prevent any undesirable increase of hydraulic pressure in the brake or brakes on the inside of the turn, that is, the side of of the aircraft to which the turn is made, thereby obviating any tendency to lock the wheel which is acting as the pivot.

The invention also ensures that the brake pressure applied to the brakes on the outer side of the turn is quickly relieved directly the turn is begun so as to obviate any danger of the aircraft nosing over by preventing any undesirable increase of pressure on the inside of the turn on the one hand, or a sluggish reduction of pressure on the outer side of the turn on the other hand.

It will also be apparent from the ensuing description that the aircraft may be steered to right or left by deflection of the rudder bar in the normal manner without any actuation of the brakes except at the will of the pilot.

The invention is also characterized by its compactness and by the automatic lubrication of all the working parts due to their enclosure in a protective casing which keeps the working liquid, such as oil, free from dust and which also constitutes an oil reservoir in which the liquid can freely mix and so facilitate equilization of temperature throughout the system.

According to this invention, fluid pressure brake apparatus supplied from a container holding liquid comprises a plurality of pistons movable by members which are displaceable longitudinally and angularly within portions of a container. A variable quantity of liquid is forced from this container to the brake applying mechanisms by the respective pistons to impart a variable pressure. Two pistons are thus simultaneously displaceable within hollow portions of the container. The axes of these two pistons converge symmetrically upon the axis of a third piston operated by external fluid pressure.

The said piston actuating members comprise two members, one of which may be rocked about a fixed control shaft and the other of which is displaceable both longitudinally and angularly along a guideway in that member which is rotatable about a fixed center.

In order that the invention may be more easily understood and readily carried into effect, the same will now be described with reference to the accompanying drawings, in which—

Fig. 1 is a part outside and part sectional plan view of the device.

Fig. 2 is a sectional view on the line C. C. of Fig. 1 in the direction of the arrows.

Fig. 3 is a diagrammatic sketch of the invention and its pipe and operative connections to the brake drum and to the rudder bar.

Fig. 4 is a sectional elevation of the liquid reservoir.

Fig. 5 is a diagram showing the relative displacement of the operating parts when the brakes are operated equally and differentially.

Fig. 6 is an elevation of the hand pump, and

Figs. 7 and 8 are part sectional elevations of the internal mechanism of the hand pump.

Fig. 9 is a sectional view of a part of the apparatus taken on line 9—9 of Fig. 10, and Fig. 10 is a sectional view taken on line 10—10 of Fig. 9;

Fig. 11 is a diagrammatic sketch showing the position of control devices of the apparatus for braking one wheel with greater force than the other as in turning the aircraft.

The invention comprises a container or casing 1 which may be a casting of light weight metal having two hollow chambers 2 and 3 extending obliquely outwards from and opening into the central body or well portion of the container which is symmetrically disposed in relation to the outwardly inclined chambers.

The central body portion may be approximately triangular in plan, the apex lying between the inner sides of the laterally diverging chambers 2 and 3, the rounded part of the central well which constitutes the main part of the body having a third chamber 4 on the center line or axis C. C. which passes symmetrically between the axes of the chambers 2 and 3.

The chambers 2 and 3 open into the casing which is completely filled with oil or other suitable liquid and each chamber is provided with a piston and piston rod.

The outer end of each of the chambers is internally threaded and is closed by a flanged cap 5 which is centrally apertured.

The outer surface of the caps to the chambers 2 and 3 is flat and the inner surface is conical so that the cap is thicker at the center than at the sides.

Upon this inner conical portion of each of the caps 5 to the chambers 2 and 3, seats a tapering helical spring 6 the greater diameter coil of which presses against the outer surface of the inner portion of the cap, the smaller diameter coil of the spring bearing against a centrally apertured washer 7 which may be of yielding material such as rubber formed with a flange around its periphery making fluid tight sliding contact with the wall of the chamber or with a liner secured thereto.

The other inner side of the washer is displaceably supported by the outer flat surface of a piston 8 provided centrally with a comparatively small diameter channel 9 extending between the inner and outer surfaces of the piston.

From the inner side of the piston and adjacent the central aperture 9 extends a conical web 10, the periphery of which merges into a flange 11, the edge of which has a toe bearing against the cylindrical sleeve to constitute a bearing surface additional to that provided by the periphery of the flat portion of the piston from which the flange 11 is spaced.

The inner surface 12 of the conical web constitutes a surface to direct the end of the piston rod 13 into the apex of the conical web which is rounded off with a part spherical or curvilinear bearing surface 14 through the center of which passes the small diameter channel 9. This spherical or curvilinear bearing surface constitutes a seat for a complementary spherical head 15, formed upon or attached to the outer end of the piston rod 13 which is pivotally connected at 16 to an actuating and piston inter-connecting member 17, displaceable longitudinally and angularly of the common axis C. C. between the obliquely disposed chambers 2 and 3. Each of these chambers is provided with the spring loaded piston and piston rod as described above.

When each piston is thrust outwards to the operative position shown in Figs. 1 and 2, the spherical head of each piston seals the small diameter channel and because the flow of brake energizing liquid into the body portion of the casing is thus prevented, the liquid between the cap and piston is expelled to the brake or group of brakes through the pipes 18 and 19. Conversely, when each piston is withdrawn from the position shown in Figs. 1 and 2, the sealing pressure is removed from the inner end of the channels 9 and the oil or other liquid employed is free to return and mix within the reservoir formed by the body of the casing.

Since the movement of withdrawal removes the outward pressure on the piston, the taper helical spring 6 causes each piston to follow its rod and assists the return of the respective columns of liquid under pressure from the brake drum gear 57 which may include spring loaded annuli, the construction of which is described and claimed in the specification to our prior Letters Patent No. 1,937,563.

As the equalized application of the brakes when the liquid in all the drums is at uniform temperature depends upon equal quantities of liquid being acted upon by the piston, two positive stops 20 are provided the ends of which contact with the flanges 11 of each piston and so predetermine the inward movement of the pistons and in consequence determine the liquid capacity of the space which is filled with oil for ejection by the pistons.

The stops 20 are screwthreaded through apertures at each end of a fixed support 21 which is itself secured by a pair of bolts 22 to the body of the container between the chambers 2 and 3.

By rotating either stop the movement of the respective pistons can be adjusted as required and may be set as required, thus counteracting any unequalizing effect due to unequal heating.

It will be understood, however, that the central casing is itself in the nature of a heat exchange and temperature equalizing unit inasmuch as the liquid returned from both brakes may freely mix in the body portion of the container.

These stops 20 are accessible together with the remainder of the internal mechanism when the top part 23, Fig. 2 of the container is removed.

The top of the casing is held to the base 24 by bolts 25 and the device itself is normally secured to the fuselage or other flat support by bolts passing through apertured lugs 26.

The rounded base of the triangular portion of the container casing is apertured on the axis of symmetry C. C. which passes between the obliquely disposed chambers and is cast with an integral tubular extension 4 having an apertured cap 5 and liner or internal piston bearing surface similar to the other chambers.

The end aperture in the cap to the chamber 4 is connected through a pipe 28 to an external source of gaseous or liquid pressure which may take the form of a hand pump 29 to be described later.

Confined within the chamber 4 is a flanged washer 30 of yielding material secured to a piston 31 by a central screw and washer. This piston 31 is cylindrical and the inner side is hollowed to a cone but the cone is not apertured and has no channel permitting flow of liquid between the casing and the hand pump or other source of liquid pressure.

The part conical and part spherical seat on the inner side of this piston 31 is engaged by a complementary spherical head 32 formed upon the outer end of a piston rod 33, the other or opposite end of which is pivotally connected to a short cylindrical shaft 34, Fig. 2, the axis of which is at right angles to the piston 31 and to the top and bottom of the casing.

The top and bottom ends of this shaft 34 normally lie in the axis of symmetry C. C. which passes centrally through the casing and bisects the angle between the obliquely disposed lateral chambers 2 and 3 which open thereon.

The top and bottom portions of the shaft 34 also pass into contact with the edges of slots 35 in a frame consisting of a pair of spaced parallel plates 36 of substantially arrow shape, the apex of the arrow normally pointing towards the side chambers 2 and 3 along the line C. C.

The parallel plates 36 are spaced and joined at their lower side corners by means of spacing projections 36a and a securing bolt 36b. This arrangement leaves the central part of the space between the plates free for the piston rod 33.

The guide slots in these spaced arrow plates 36 register with one another, but the arrow shaped frame in which they are cut is angularly displaceable by rotation about a fixed pivot in the region of the base of said plates.

This angular displacement is effected by integral formation or connection of one of the arrow plates to a spindle 37 parallel to the shaft 34, the spindle being connected to one of the plates at right angles, and passing upwards and outwards through a bearing in the casing at substantially the center of the body portion thereof.

The other arrow plate is connected to a cylindrical projection 38 having a bearing in the base of the container.

The spindle 37 is connected to a crank or lever 39 which extends laterally and is connected to the rudder bar 40 or other steering gear by a link 41.

In addition to sliding contact between its upper and lower ends with the slots in the rotatable arrow shaped plates, the central part of the shaft pivotally fits through two apertures in a further frame consisting of a pair of spaced and substantially triangularly shaped plates 17, so positioned in association with the arrow plates as to produce in conjunction therewith a longitudinally and angularly displaceable inter-connection between all the piston rods, resembling that of a letter X. The two shorter sides of these triangular plates 17 adjacent the chambers 2 and 3 are but slightly inclined to one another.

The longer sides of these plates, however, which meet with an acute angle around the shaft 34 merge with rounded corners into each of the shorter side portions at an angle somewhat less than 90°.

Between these triangular plates 17 and at each of the angles which are slightly less than a right angle is pivotally attached the inner end of each of the piston rods 13, one of which actuates the piston in each of the side chambers 2 and 3.

The upper and lower triangular plates of the piston inter-connecting frame 17 are spaced by an inter-connecting bush 43, Fig. 2, located at the obtuse angle defined by the intersection of the shorter sides. This bush moves with the frame 17 along the axis of symmetry C. C. in a strong guideway fork 44 which is fixed to the container wall and extends inwards for a short distance from the angle between the side chambers towards the central portion of the main casing.

The frame 17 is thus movable both longitudinally along and with angular displacement about the fixed fork guideway 44 with respect to the central axis and the arrow plates 36 are movable with rotational displacement about the fixed pivot 37, 38, in the same central axis of symmetry.

The relative longitudinal displacement of the arrow plates 36 and the triangular plates 17 is effected against the tension of a pair of coil springs 27 connected between pins on the arrow plates and fixed hooks 42.

When the master pressure of the piston 30 is relieved the springs 27 quickly withdraw the piston rods 13 to a distance such that the liquid channels are unsealed when the piston flanges 11 contact the stops 20.

The articulated inter-connection so obtained may be deformed by displacement of the central intersection to left or right, thereby decreasing the displacement of right or left piston 8, respectively.

The external fluid pressure means by which the piston 30 is displaced comprises a hand operated pump as shown in Figs. 6, 7 and 8. This pump comprises a body portion 29 which is expanded at its upper end to contain a shaft 45 with which a crank 46 is rotatable by a handle 47. The crank is connected to one end of a plunger rod 48, the other end of which is of part spherical formation and displaceably engages and seals a channel 51 in a seating surface formed in the plunger 49.

The upper part of the casing is also connected by a pipe 50 to a small oil reservoir (not shown) so that the portion of the pump casing 29 below the plunger is always maintained full of oil.

On raising the handle, the plunger rod 48 unseals the channel 51 which passes through the plunger and so enables the part below it to be kept full of oil.

The base of the casing of the pump beneath the plunger is connected to the piston 30 through a pipe 28. The return of the plunger is ensured by a helical compression spring 52, and the upward travel of the plunger is limited by a shoulder stop 53 such that when the handle 47 is fully raised, the plunger rod 48 unseals the channel 51.

In order that the pilot may be enabled to remove his hand from the pressure pump handle 47, this handle carries a small ratchet lever 54 which, on contraction against the handle, displaces a pawl 55 from an arcuate rack 56.

The pilot may thus exercise the required pressure which may be indicated to him by suitable gauges and release the handle when such pressure is obtained.

In operation to apply equal pressure to two wheels or groups of wheels on opposite sides of the fuselage, the pilot uses the hand pump to apply pressure to the piston 31 which operates at the base or rounded end of the container.

The arrow frame 36 being symmetrically disposed, the guide slot 35 and shaft 34 is also coincident with the axis C. C. and in consequence, the triangular plates 17 are also moved solely in a longitudinal direction along the axis of symmetry C. C. towards the lateral chambers, the symmetrical position maintained by the parts in relation to the axis C. C. being shown in diagram form by the solid lines in Fig. 5.

The spherical ends of the piston rods move outwards, contact the pistons, seal the oil release, and push the piston and the liquid now trapped behind them down the respective pipes with equal pressure to energize the brakes. Conversely, when the master pressure is reduced or released, the piston rods and pistons are retracted and the oil or liquid is returned to the casing which acts as a reservoir.

The liquid therein also lubricates all the working parts and the casing prevents the ingress of dust.

If unequal pressure is to be applied to the different brakes, the pilot again exerts or sets a convenient master pressure by his hand pump, or by release of other liquid or pneumatic pressure, and then turns his rudder bar as required or, he may if he wishes turn the bar first and then apply initially different brake pressure by operating his hand pump.

Assuming the turn is to the left, then the left hand end of the rudder bar pedal is pushed forward as shown by the arrow in Fig. 3, and this causes a corresponding movement of the crank 39 connecting the rudder bar to the spindle and the arrow plates which in consequence with their guideways are rotated in a clockwise direction. The plates 13 and 17, and the pistons then take the position shown diagrammatically in Fig. 11.

The triangular plates consequently move in an anti-clockwise direction as shown diagrammatically in Fig. 5, and the left hand piston rod as shown in Fig. 5 is progressively and quickly withdrawn from its valvular piston head to release or reduce the pressure on the right hand or starboard brakes to which the chamber 3 is connected as shown in Fig. 3, the left hand chamber 2 being connected to the port brakes.

When turning to the left, the pilot pushes forward the left hand side of the rudder bar about its central pivot in the direction of the arrow A, Fig. 3, the arrow plates are rotated clockwise as in the previous case and comparatively high brake pressure is transmitted from the chamber 2 to the left hand or port brakes while the starboard or right hand brakes remain substantially unaffected.

But any very rapid or dangerous increase of the pressure in the port or left hand brakes above that already set is prevented from happening because as the pilot diminishes the diameter of his turn to the left by further movement of his rudder, so does the anti-clockwise angular displacement of the triangular plates increase whereby pressure is very rapidly removed from the starboard brakes but remains substantially as set in the port brakes, thereby automatically safeguarding against any dangerously large and undesired increase which might suddenly lock the wheel or wheels on the side to which the turn is made.

The relative symmetrical and asymmetrical displacement of the parts is shown in diagram form by the dotted lines in Fig. 5 from which it will be seen that while the left hand piston connecting point 16 is displaced from a position 16 to a position 16a when the rudder bar is deflected, the other piston rod connecting point 16 remains substantially stationary although the shaft 34 has been displaced along a circular path to the position 34a and the bush 43 has been withdrawn along the fork guideway in fixed register with the axis C. C. to the position 43a.

Although we have described a liquid pump for exerting the master pressure, it will be evident to those skilled in the art that any kind of fluid pressure such as pneumatic pressure may be applied thereto.

The brake system also includes a reservoir within a box which may take the form of a domed metal cap detachably clamped by flanges 59 to a bracket 60 attached to a convenient portion of the cockpit adjacent the pilot.

The box 58 contains a flexible liquid reservoir 61 filled through a suitable closure 62, access to which is obtained by removing the box.

The internal fluid reservoir 61 and its housing 58 are positioned vertically above the level of the pump 29 and in consequence the liquid in the flexible container 61 is gravity fed through the pipe 63 at its base to the pipe junction 67, Fig. 3.

From this junction, two pipes extend, one pipe 50 maintaining a supply of liquid to the pump, the second pipe 64 maintaining the supply of operating fluid for the pistons 2 and 3 in the container 1 by a connection thereto at 65.

When the pump hand is operated, the plunger of the pump and the pistons 2 and 3 and 31, displace liquid from their respective compartments, and in consequence would create a partial vacuum in the container were this not automatically prevented from occurring by the ability to suck fluid temporarily from the collapsible reservoir 61.

Should an air pump or bottle be employed to displace the piston 31, the reservoir 58 will only be connected to the container 1.

The pipes 18, 19 leading to the brakes and the pipes 28, 50 and 64 inter-connecting the pump with the piston container 1, are all preferably of copper to avoid any loss in compression, but the loops 66 shown in Fig. 3 which accommodate the movement of the under-carriage may, if desired, consist of short lengths of suitably reinforced rubber hose.

As will be seen from Fig. 3, the angle between the rudder bar 40 and the link 41, and between the link 41 and the crank 39 is 90° when the parts are assembled as shown with the rudder bar in the inoperative position and when the rudder bar is deflected, and angular movement of the crank 39 through an arc of 30° in a clockwise or anticlockwise direction should be allowed for.

What we claim is—

1. Fluid brake pressure apparatus comprising a fluid container, a pair of pistons movable to force fluid from said container to respective brake apparatus, and mechanism displaceable longitudinally and angularly within said container to move said pistons through a variable distance to exert a variable pressure.

2. Brake apparatus according to claim 1 having a third piston to drive said displaceable means and in which the pistons of said pair are simultaneously displaceable by the displaceable mechanism on axes which converge symmetrically upon the axis of movement of said third piston.

3. Fluid pressure brake actuating apparatus which comprises a fluid container, a pair of driven pistons movable to force fluid from said chamber to separate brake apparatus, a piston moving in a line symmetrically intersecting the line of movement of said brake actuating pistons, and transmission mechanisms between said pair of pistons and said actuating piston, said transmission mechanism comprising a member movable longitudinally on the axis of said driving piston and having connections offset on opposite sides from said axis to said driven pistons, and controllable means for tilting said member to one side or the other of said axis.

4. Fluid pressure brake actuating apparatus which comprises a fluid container, a pair of driven pistons movable to force fluid from said chamber to separate brake apparatus, a piston moving in a line symmetrically intersecting the line of movement of said brake actuating pistons, and transmission mechanisms between said pair of pistons and said actuating piston, said transmission mechanism comprising a member movable longitudinally on the axis of said driving piston and having connections offset on opposite sides from said axis to said driven pistons, and controllable means for tilting said member to one side or the other of said axis, said tilting means comprising a guide swinging from a pivot point on the axis of movement of said driving piston, and a pin in said member slidable in said guide.

5. Fluid pressure brake actuating apparatus which comprises a fluid container, a pair of driven pistons movable to force fluid from said chamber to separate brake apparatus, a piston moving in a line symmetrically intersecting the line of movement of said brake actuating pistons, and transmission mechanisms between said pair of pistons and said actuating piston, said transmission mechanism comprising a member movable longitudinally on the axis of said driving piston and having connections offset on opposite sides from said axis to said driven pistons, and controllable means for tilting said member to one side or the other of said axis, said tilting means comprising a guide swinging from a pivot point on the axis of movement of said driving piston, and a pin in said member slidable in said guide, said member being guided at its opposite end in a groove aligned with the axis of movement of said driving piston.

6. Fluid pressure brake actuating apparatus which comprises a fluid container, a pair of driven pistons movable to force fluid from said container to separate brake apparatus, a piston moving in a line symmetrically intersecting the line of movement of said brake actuating pistons, and transmission mechanisms between said pair of pistons and said actuating piston, said transmission mechanism comprising a member movable longitudinally on the axis of said driving piston and having connections offset on opposite sides from said axis to said driven pistons, controllable means for tilting said member to one side or the other of said axis, and means for supplying fluid to said container.

7. Fluid pressure brake actuating apparatus which comprises a fluid container, a pair of driven pistons movable to force fluid from said chamber to separate brake apparatus, a piston moving in a line symmetrically intersecting the line of movement of said brake actuating pistons, and transmission mechanisms between said pair of pistons and said actuating piston, said transmission mechanism comprising a member movable longitudinally on the axis of said driving piston and having connections offset on opposite sides from said axis to said driven pistons, and controllable means for tilting said member to one side or the other of said axis, said driven pistons having passages therethrough and said transmission mechanisms comprising piston rods positioned to close said passages during the driving movement and retractable therefrom to open said passages during return movement.

8. Fluid brake pressure apparatus comprising a fluid container, a pair of pistons movable to force fluid from said container to respective brake apparatus and means to move said pistons through a variable distance to exert pressures proportioned in variable proportions between said pistons, said means comprising two members, one of said members having a guide-way rotatable about a fixed axis, and the other member being displaceable longitudinally and angularly about an axis movable along said guide-way of the first member.

9. Fluid brake pressure apparatus comprising a fluid container, a pair of pistons movable to force fluid from said container to respective brake apparatus and means to displace said pistons in variable proportions to each other to variable distances, said means comprising two members, one of the said members having a guide-way rotatable about a fixed axis and the other member being displaceable both longitudinally and angularly about an axis movable along said guide-way of said first member, a shaft interconnecting said members and a piston acting on said shaft to drive said second member along said guide-way.

10. Fluid pressure brake actuating apparatus which comprises a pair of pistons, a driving piston, transmission means connected to each of said pistons, and means pivoted in alignment with the connection of said transmission means to said driving piston when said driving piston is in inactive position to tilt said transmission toward one or the other of said pair of pistons to shorten the transmission distance between said piston to which the transmission is tilted and said driving piston relative to the transmission between the other piston and said driving piston.

11. A fluid pressure brake applying mechanism which comprises a pair of pistons, a driving means movable from an inactive position to brake applying position, a transmission means connecting said pair of pistons to said driving means, and means pivoted in alignment with the connection of said driving means to said transmission means to change the relative effective transmission distance between said driving means and said pistons when in brake applying position.

ERNEST FREDERICK GOODYEAR.
  JOSEPH WRIGHT.
  HENRY WILLIAM TREVASKIS.